United States Patent [19]
Hebert

[11] Patent Number: 5,967,579
[45] Date of Patent: Oct. 19, 1999

[54] INDUSTRIAL DIAPER FOR FLEXIBLE BULK CONTAINERS

[76] Inventor: Jon Barry Hebert, 22 Giles St., Westbrook, Me. 04092

[21] Appl. No.: 08/967,843

[22] Filed: Nov. 12, 1997

[51] Int. Cl.$^6$ .................................................. B65D 33/14
[52] U.S. Cl. .......................... 294/74; 222/105; 294/68.1; 383/24; 383/67; 383/111
[58] Field of Search ................................. 294/67.4, 68.1, 294/68.2, 68.21, 68.3, 74, 77, 149, 152, 157; 222/105, 181.1, 181.2, 183; 383/4, 6, 13, 16–18, 20, 22–24, 67, 111, 119

[56] References Cited

U.S. PATENT DOCUMENTS

| | | |
|---|---|---|
| Re. 35,270 | 6/1996 | Polett . |
| 3,084,966 | 4/1963 | Higgins ...................................... 294/77 |
| 3,282,621 | 11/1966 | Peterson ................................ 294/77 X |
| 4,390,051 | 6/1983 | Cuthbertson . |
| 4,480,766 | 11/1984 | Platt . |
| 4,759,473 | 7/1988 | Derby et al. ........................... 383/67 X |
| 4,767,035 | 8/1988 | Jacobi . |
| 5,161,853 | 11/1992 | Polett . |
| 5,203,633 | 4/1993 | Derry . |
| 5,316,387 | 5/1994 | Polett . |
| 5,340,217 | 8/1994 | Rothman . |
| 5,423,611 | 6/1995 | Sherrard ................................ 383/67 X |
| 5,529,393 | 6/1996 | Polett . |
| 5,649,767 | 7/1997 | Nickell . |
| 5,865,540 | 2/1999 | Derby et al. ............................... 383/24 |

OTHER PUBLICATIONS

Flexible Bulk Container Size and Style Chart, Eastern Bag Connection, Inc., Biddeford, Maine.

Sackpatch ™ Tape, bulletin No. 880802, B.A.G. Corporation, Dallas, Texas.

Super Sack (™) Brochure, B.A.G. Corporation, Dallas, Texas.

Primary Examiner—Johnny D. Cherry
Attorney, Agent, or Firm—Martin S. Chizek

[57] ABSTRACT

A method and reusable device for preventing or limiting the leakage of flowable material from a damaged flexible bulk container. The device includes a central panel and a plurality of flexible aprons, brought into firm engagement with the bottom and lower side, respectively, of the damaged flexible bulk container by means of elastic members. After securing the device to the damaged flexible bulk container, the container may be handled, stored and transported, with the device minimizing and containing spillage of flowable material in and about the damaged flexible bulk container. An aperture in the central panel accommodates the flexible bulk container discharge spout, and allows the contents of the container to be discharged therethrough. Other embodiments of the invention include an aperture in one of the flexible aprons to accommodate side-discharge flexible bulk containers, and extension flaps on each flexible apron to contain leakage from the upper sides of a damaged flexible bulk container.

18 Claims, 10 Drawing Sheets

INDUSTRIAL DIAPER FOR FLEXIBLE BULK CONTAINERS

FIELD OF THE INVENTION

The invention relates generally to flexible containers used in the transport and/or temporary storage of various dry, pourable bulk materials. More specifically, the invention is directed to a method and reusable device for preventing or limiting the leakage of product from a damaged flexible bulk container.

BACKGROUND OF THE INVENTION

Large flexible fabric bags for containing and transporting flowable granular or powdered bulk material such as chemicals, minerals, foodstuff, agricultural products, pharmaceutical and cosmetic ingredients and the like have been used for many years, and their use is becoming increasingly popular. This is due to their relatively low cost and the fact that when the bags are empty, they take up very little space and are relatively light in weight. When filled, the flexible bulk containers may carry 70 cubic feet or more of material and may weigh in excess of two tons.

The bags used for such purposes have to fulfill several practical requirements. It is of primary importance that the construction of the bag must be such as to sustain heavy loads but, at the same time, the bag must be adapted to be folded or collapsed when empty to a compact and preferably flat form. Frequently, because of the nature and quantity of material shipped in such bags, the bags should also be designed so that they can be easily filled with large quantities of granular and powdered bulk materials and then readily emptied of their contents. It is also desired that such bags be designed so that, when filled, they can be easily handled, and are generally free-standing and capable of being stacked vertically one upon another. To meet these requirements, the containers are frequently made of a film or sheet of a flexible generally impervious material such as polypropylene or polyethylene.

While a variety of bags and bag construction have been suggested and used as flexible bulk containers, most flexible bulk containers possess the common elements of a flexible, inextensible bag with a fill spout on top, discharge chute on or near the bottom of the bag, and a plurality of lifting straps on or near the upper edge of the bag. Variations to this base design include internal structural enhancements such as U.S. Pat. No. 5,316,387 to Polett, and improvements to the lifting and support means as found in U.S. Pat. No. 5,340,217 to Rothman, U.S. Pat. No. 5,161,853 to Polett, and U.S. Pat. No. 5,203,633 to Derby. Another line of improvements to flexible bulk containers includes the addition of internal liners such as those described in U.S. Pat. No. 5,529,393 to Polett, U.S. Pat. No. 5,649,767 to Nickell, and U.S. Pat. No. 4,390,051 to Cuthbertson. While the container discharge chute is generally located in the bottom center of the bag, the discharge chute may be located along the bottom edge of the container sidewall as described in U.S. Pat. No. 4,767,035 to Jacobi. Finally, while the flexible bulk containers generally take on a cubical shape when filled, some containers may be cylindrically shaped such as the container disclosed in U.S. Pat. No. 4,480,766 to Platt.

Although these bags and containers are common in industry, there are several shortcomings which have been encountered during the handling, transportation and storage of such flexible bulk containers. For example, the containers are generally handled by fork trucks within facilities, stored on wooden pallets, then loaded onto plywood-lined trailer trucks or rail cars for transportation. During this handling and transportation, the containers often come into contact with sharp objects such as nails, bolts, or wooden splinters from the pallets or plywood. Occasionally, the containers are even punctured by the fork truck forks themselves. Due to the flowable granular nature of the material within the containers, this material easily and quickly leaks out of a damaged container. Since the diameter of the contained material may be as fine as 50 microns, even a small hole in the container can lead to significant leakage. Leakage results in loss of material which, in the case of exotic material such as tungsten, can be quite expensive. Additionally, many customers will not accept delivery of a leaking bag, resulting in the expense of shipping the leaking bag back to its original destination. Finally, the dust generated by leaking containers results in housekeeping expenses, and can become an inhalation safety hazard to workers.

Currently, tear or puncture holes in flexible bulk containers are dealt with in several ways. The simplest method to stop leakage is to stuff a rag or sheet of flexible material into the hole. While this approach may temporarily halt the flow of material, the rag or sheet is susceptible to falling out of the hole during handling and transportation, resulting in continued leakage. Additionally, when the material is being discharged from the container, the container changes shape and, at some point, the rag or sheet tends to fall from the hole or out the container discharge chute. The rag or sheet can then result in contamination of the material or interfere with machinery during subsequent material processing. Similarly, if the outside of the flexible bulk container has picked up wooden splinters during handling and storage, the wooden splinters can fall from the container during product discharge and contaminate the process.

Another approach to stopping leakage due to tear or puncture holes in a flexible bulk container is to apply an adhesive patch over the hole. Commercial patches currently exist for this purpose, such as the Sackpatch™ marketed by the B.A.G.™ Corporation. These patches are generally made of polypropylene and are applied by means of adhesive to the outside of the container over the hole. The drawback of these patches is that the container is generally dusty, particularly if the container has been leaking, and the area around the perimeter of the hole must be thoroughly cleaned for the patch to properly adhere to the container fabric. Additionally, the patch adhesive may not properly bond to the outside of the container at lower temperatures. When the material is being discharged from the container, the container changes shape and can cause the patch to become dislodged from the container. Similar to the rag or sheet drawback, the patch can fall from the hole and result in contamination of the material or interference with machinery during subsequent material processing.

Another response to flexible bulk containers which are leaking product or have been penetrated by splinters is to ship the container back to the warehouse to have the enclosed product transferred from the damaged container to an undamaged empty container.

Alternatively, the damaged container can be placed inside another larger flexible bulk container, such as the two-piece re-usable flexible bulk container disclosed in U.S. Pat. No. 35,270 to Polett. Either way, this method incurs additional shipping, handling and container costs, and can be dangerous due to the manual handling required for the transfer.

Additionally, if the contents of the damaged container are transferred to a new container, the dust generated by the transfer process results in extra housekeeping expenses and possible inhalation hazards to workers.

OBJECTIVES OF THE INVENTION

Accordingly, it is an object of the present invention to provide a simple, reusable, economical device and method for preventing the leakage of product from a damaged flexible bulk container.

Another object is to provide a device and method for preventing the leakage of product from a damaged flexible bulk container which will accommodate a wide variety of flexible bulk container designs, sizes and variations.

Another object is to provide a device and method for preventing the leakage of product from a damaged flexible bulk container which minimizes the contamination of air and thus eliminates housekeeping costs and prevents potential inhalation hazards to workers.

Another object is to provide a device and method for preventing the leakage of product from a damaged flexible bulk container which eliminates the possibility of contamination of product or interference with process machinery which may result when using rags, sheets or patches to seal a leaking container.

Another object is to provide a device and method for preventing the leakage of product from a flexible bulk container penetrated by splinters that allows the continued usage of the container yet prevents the splinters from contaminating the product during discharge.

Still another object is to provide a device and method for preventing the leakage of product from a damaged flexible bulk container which eliminates the shipping and handling costs of returning damaged containers back to the originating warehouse for transfer of the product to an undamaged container.

Yet another objective is to provide a device and method for preventing the leakage of product from a damaged flexible bulk container which eliminates danger of transferring the contents from a damaged container to an undamaged container.

These and still further objects are addressed hereinafter.

SUMMARY OF THE INVENTION

The foregoing objects are achieved, generally, in a flexible reusable diaper brought into firm engagement with the bottom and lower sides of the damaged flexible bulk container by means of elastic securing means, after which said container may be handled, stored and transported, with the diaper minimizing and containing spillage of flowable material in and about said damaged flexible bulk container, and providing an aperture in the diaper which receives the flexible bulk container discharge spout, and allows the contents of the container to be discharged therethrough.

DETAILED DESCRIPTION OF THE INVENTION

Figure 1:
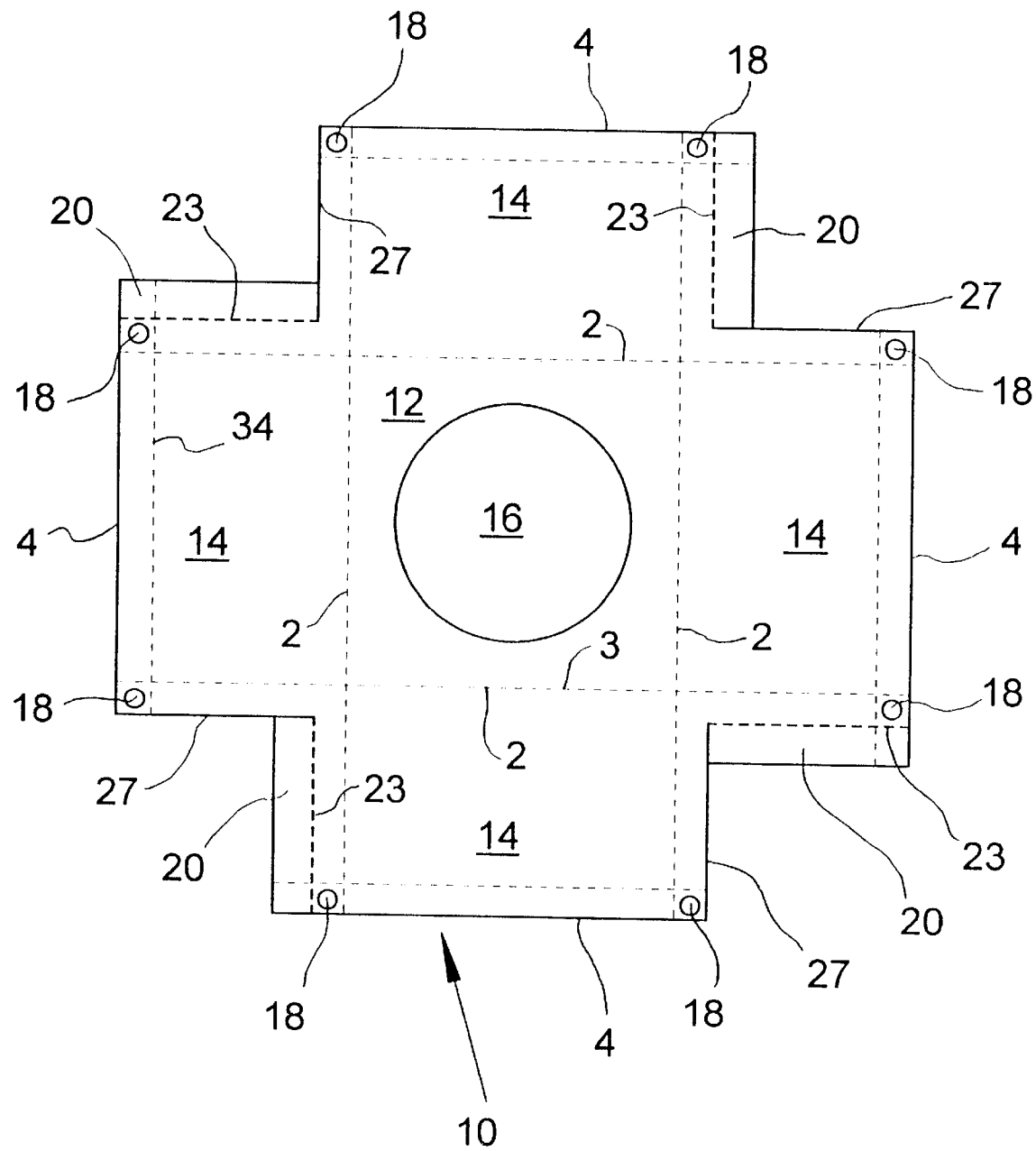
FIG. 1 shows a top view of an Industrial Diaper constructed according to a preferred embodiment of the invention.

FIG. 1 illustrates a preferred embodiment of the Industrial Diaper constructed in accordance with the principles of the present invention, designated as 10. The Industrial Diaper 10 is of flexible, collapsible construction and is comprised of the combination of a central panel 12 with a peripheral edge 3 and four flexible aprons 14, each apron having an inside edge 2, first side edge 23, second side edge 27 and distal edge 4. The apron inside edge 2 can be attached to the central panel peripheral edge 3 by conventional means such as stitching, or can merely be an integral part of the central panel material. A discharge chute aperture 16 is defined within the central panel 12, preferably substantially in its center. Each of the four flexible aprons 14 includes a pair of conventional grommets 18, one grommet located at or near the intersection of the distal edge 4 with the first side edge 23 and second side edge 27. Each flexible apron further includes a flap 20 attached to and extending from first side edge 23. The flaps 20 may be secured to first side edges 23 by stitching or other conventional securing means. Alternatively, the flap may simply be an integral part of the flexible apron material with an incision cut at the inside corner of the flexible apron to allow a section of the flexible apron material to function as a flap. The material of which the Industrial Diaper is constructed is preferably folded over onto itself at the distal edges 4, first side edges 23 and second side edges 27 and secured by stitches 34 to add strength to the edges as well as to prevent material fraying.

Figure 2A:
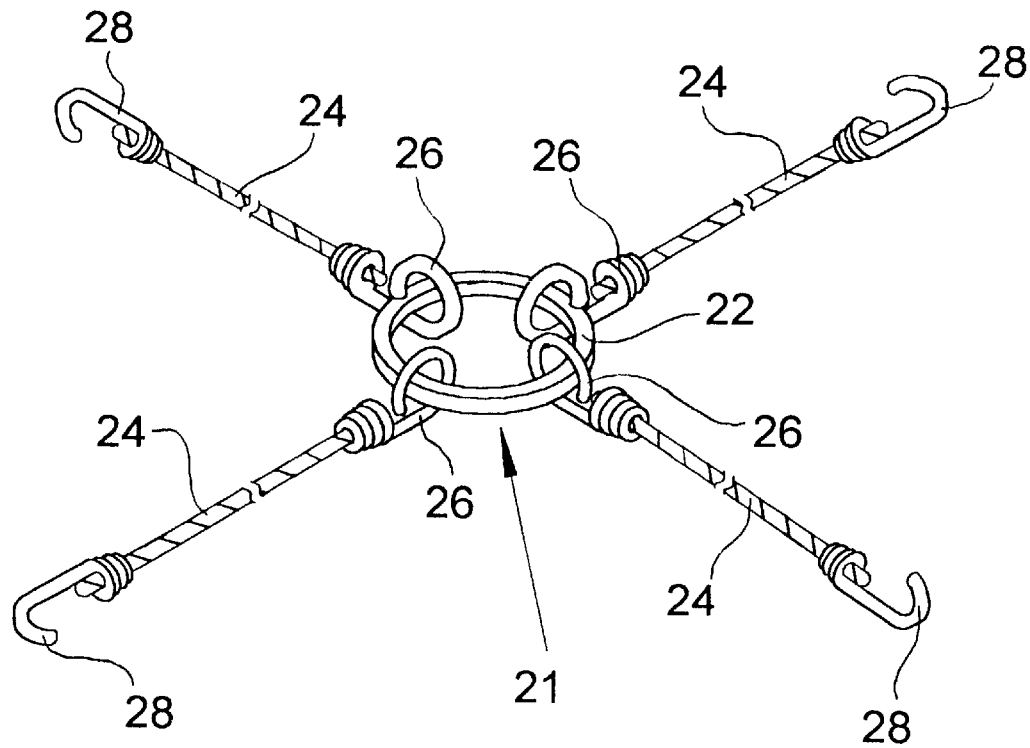
FIG. 2A shows a top perspective view of the securing means used to attach the Industrial Diaper of FIG. 1 to a damaged flexible bulk container.

FIG. 2A illustrates the securing means 21 which is used to secure the Industrial Diaper 10 to a flexible bulk container. An annular member 22 is provided which can be of any conventional material. Four elastic members 24 each include an inner hook 26 and an outer hook 28. The inner and outer hooks are attached to their respective elastic members by any conventional methods.

Figure 2B:
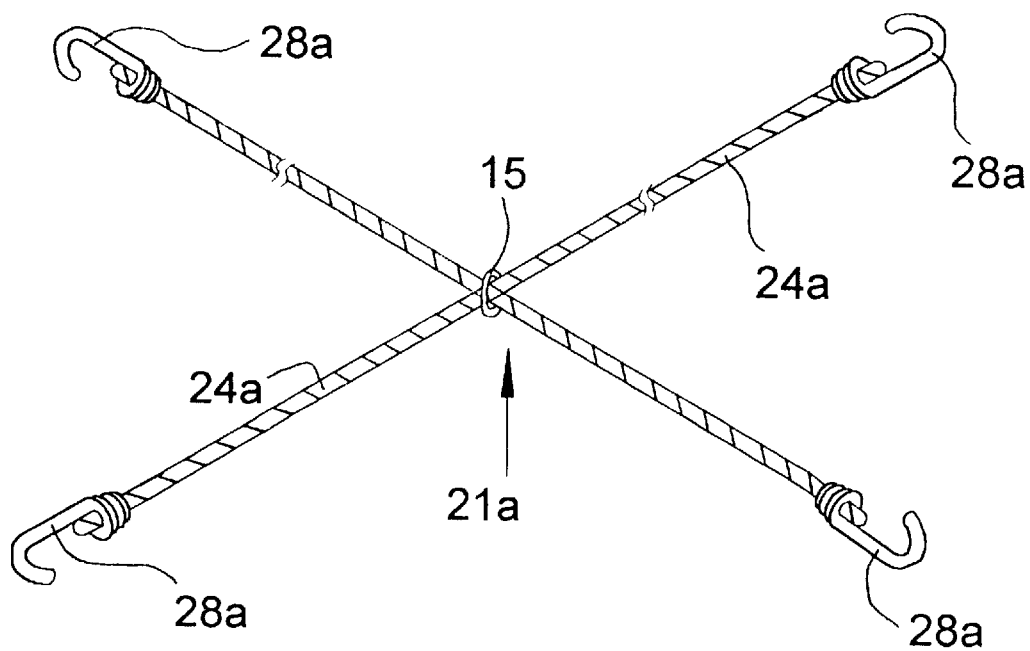
FIG. 2B shows a top perspective view of an alternative securing means used to attach the Industrial Diaper to a damaged flexible bulk container.

FIG. 2B illustrates an alternative to using the described four elastic members and the annular member, whereby securing means 21a comprises two elastic members 24a with a hook 28a provided on the ends thereof Securing means 21a is maintained as a unit by a conventional crimping fastener 15.

Figure 3:
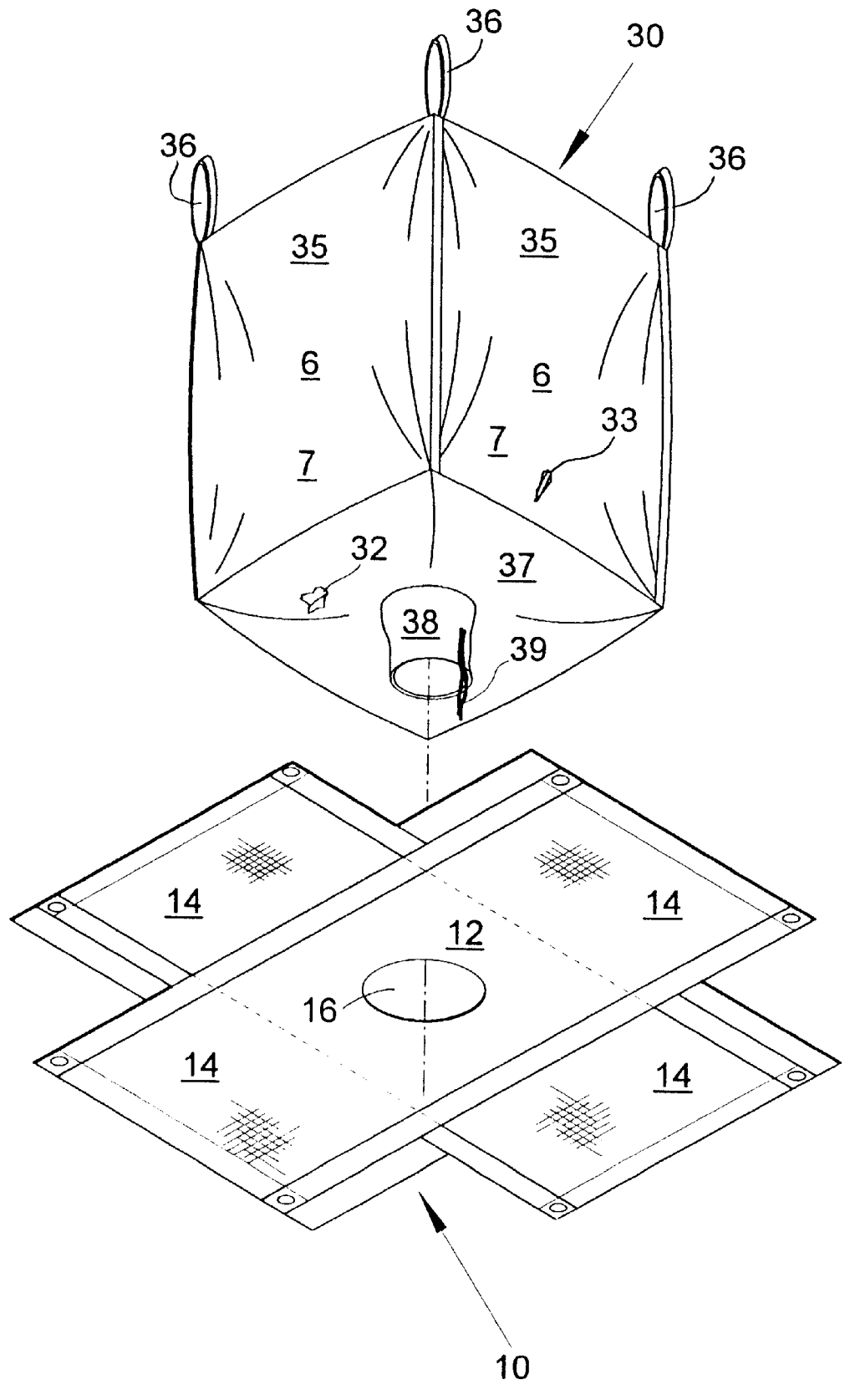
FIG. 3 shows a bottom perspective view of the present invention of FIG. 1 properly aligned for engagement with a damaged flexible bulk container.
Figure 4:
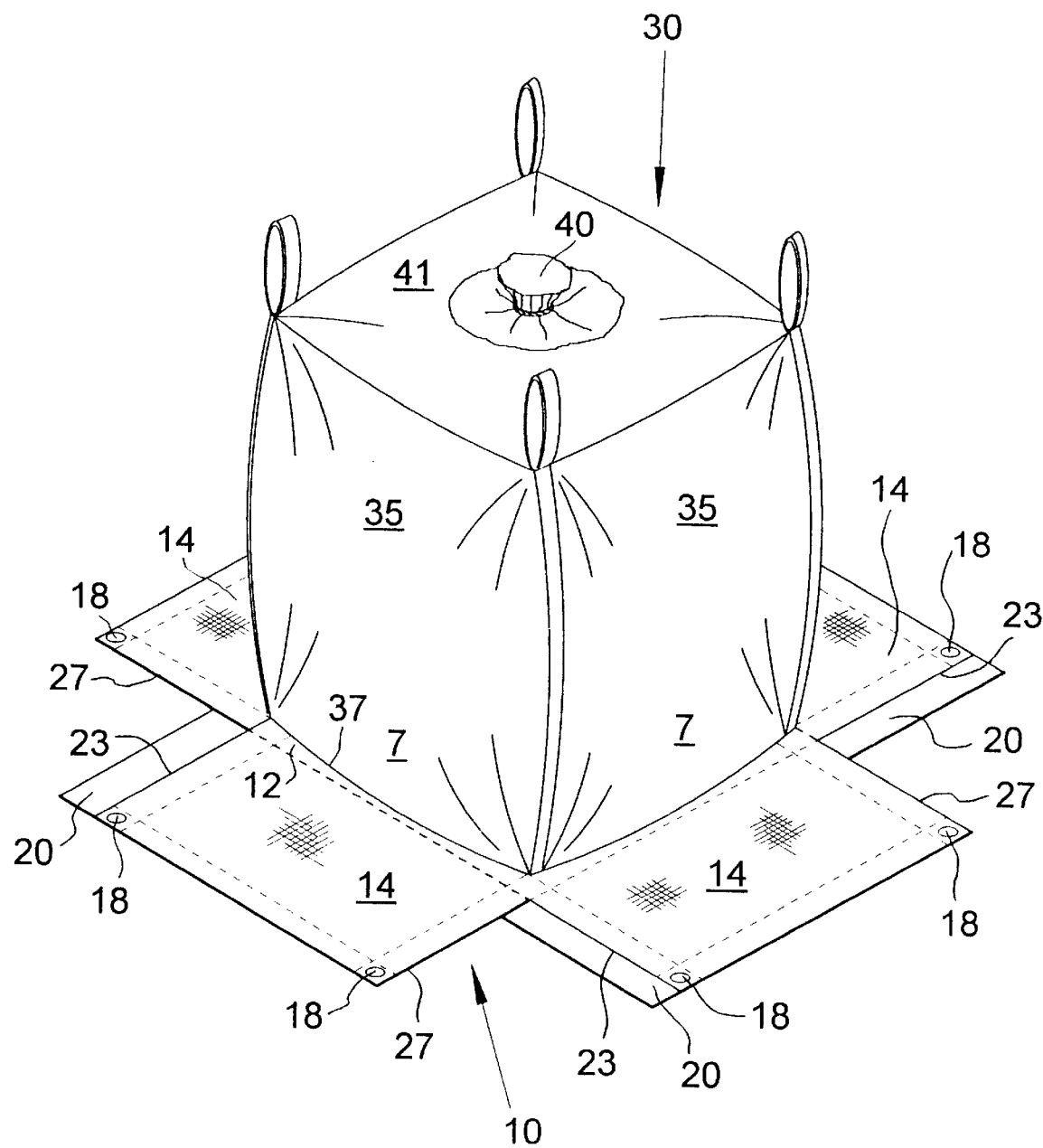
FIG. 4 shows a top perspective view of the present invention of FIG. 1, with the central panel thereof in proper engagement with the bottom wall of a damaged flexible bulk container.
Figure 5:
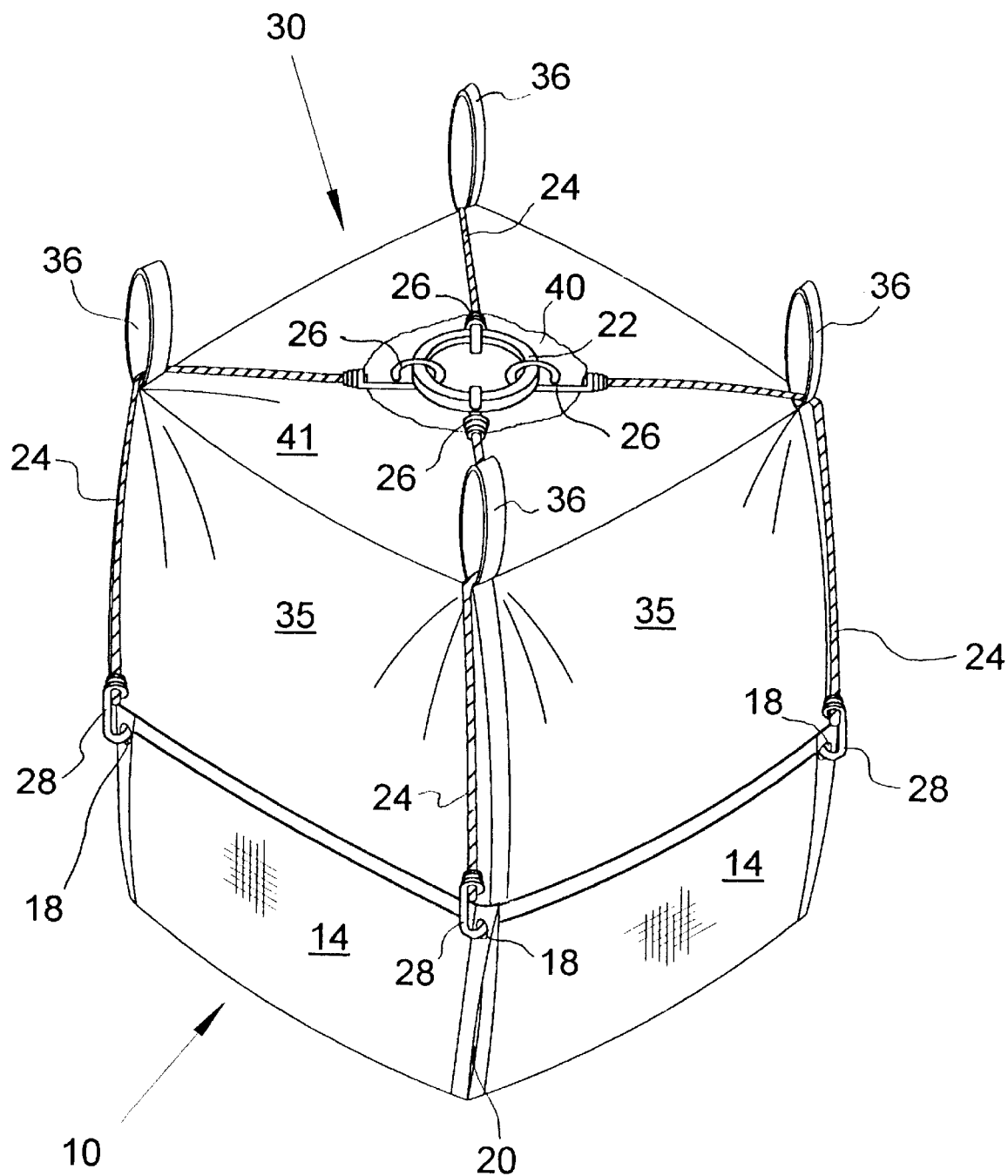
FIG. 5 shows a top perspective view of a damaged flexible bulk container with the present invention of FIG. 1 attached in place.

FIGS. 3 through 5 illustrate the assembly and usage of the present invention in its preferred embodiment with a conventional flexible bulk container. In FIG. 3 is shown a conventional prior art flexible bulk container 30 filled with flowable material and containing a tear or hole 32, and splinter 33. Said flexible bulk container generally includes bag side walls 35 with middle section 6 and lower section 7, a bottom wall 37, lifting straps 36, and discharge chute 38 with a tie cord 39 or other conventional means used to close off said discharge chute.

To attach the Industrial Diaper to a damaged flexible bulk container, the Industrial Diaper 10 is first laid on a flat hard surface and the damaged flexible bulk container 30 is suspended by lifting straps 36 substantially over the center of the Diaper central panel 12 by means of forklift truck or other conventional suspending means. Since the Industrial Diaper 10 is essentially symmetrical, either face of the Diaper may be positioned toward the damaged container. If the damaged container is of the cubical-shaped design, the Diaper should be aligned such that each Diaper flexible apron 14 is substantially perpendicular to a container side wall 35 of said cubical shaped container, as shown in FIG. 3.

Any existing rag or patching material is then removed from tear or hole 32, and any large splinter 33 is likewise removed from the container bottom and side wall. The flexible bulk container 30 is then lowered onto the Industrial Diaper 10 such that the container discharge chute 38 cooperates with aperture 16, each flexible apron 14 remaining substantially perpendicular to its cooperating container side wall 35. The damaged flexible bulk container should be lowered onto the Industrial Diaper as soon as the existing rag, patching material or splinter is removed so as to minimize leakage of flowable material from the container bottom and side walls.

In FIG. 4 and FIG. 5 is shown the damaged flexible bulk container 30 further comprising a fill spout 40 disposed within a top wall 41. After the container 30 is lowered onto the Industrial Diaper 10, annular member 22 is placed on the bag top wall 41, substantially in its center and/or over fill spout 40. Inner hook 26 of one of the four elastic members 24 is then hooked into annular member 22. Each outer hook 28 along with the elastic member 24 is preferably threaded through one of the bag lifting straps 36 such that it extends outwardly from the center of annular member 22. The two adjacent Industrial Diaper flexible aprons 14 nearest outer hook 28 are then lifted upwardly and substantially perpendicularly from their original position and brought into engagement with the container side wall lower section 7, with flap 20 folded inside of the second side edge 27 of the adjacent flexible apron 14. The corners of the two adjacent flexible aprons are positioned such that grommet 18 of each adjacent flexible apron moves into cooperation. Outer hook 28 is then inserted through both cooperating grommets. This process is repeated for each of the remaining three elastic members 24 until each flexible apron grommet is secured by an outer hook. If the alternative securing means 21a illustrated in FIG. 2B is utilized, the usage procedure is the same, except that means 21a is placed on the container top wall 41 with the crimping fastener 15 substantially at its center, and hooks 28a are inserted through cooperating grommets 18.

In its attached and secured configuration the Industrial Diaper should be contoured to the lower portion of the damaged container 30, with central panel 12 secured tightly to the bottom wall 37 of the damaged container 30, and each of the flexible aprons 14 secured tightly to the adjacent side wall 35. The central panel and flexible aprons minimize and contain spillage of flowable material in and about the damaged flexible bulk container. Flap 20 prevents leakage of flowable product between each flexible apron first side edge 23 and second side edge 27.

After the Industrial Diaper 10 has been secured to the damaged flexible bulk container by securing means 21 or 21a as described, said container may be handled, loaded and shipped via the lifting straps 36 without leakage of its flowable contents. Additionally, if the outside of the flexible bulk container has been penetrated by small splinters, the splinters will be trapped between the container and the Diaper, thus preventing leakage of flowable material during handling and transportation, and preventing the splinters from entering the production process during discharge. When discharge of the damaged container is desired, the container is suspended by its lifting straps over a receiving bin, and the tying means 39 closing the bag discharge chute 38 is loosened. The contained product is then allowed to flow out of said discharge chute and through the Industrial Diaper discharge chute aperture 16 shown in FIG. 3.

The Industrial Diaper may be constructed of any suitable strong material which is flexible but substantially inextensible. Natural or synthetic woven material can be employed such as jute cotton, polyethylene or polypropylene being typically used because of its strength, durability and puncture resistance. Because the Industrial Diaper is designed to be used with a variety of flexible bulk containers currently marketed, the dimensions of the present invention will be dependent upon the dimensions of the containers. The Industrial Diaper 10 should be of sufficient size so that when attached to a damaged flexible bulk container by securing means 21 or 21a, central panel 12 is brought into firm engagement with bag bottom wall 37 and flexible aprons 14 are brought into firm engagement with the lower sections of bag side walls 35 such that flowable material within the container is prevented from leaking out of the hole or tear 32 or past splinter 33. The perimeter dimensions of the Industrial Diaper central panel 12 should exceed by two to three inches the "footprint" of the filled bag bottom wall 37 to which it is to be attached. Similarly, the flexible aprons 14 of the Industrial Diaper should be of such dimension that, when secured to a damaged flexible bulk container by securing means 21 or 21a, they extend upwards approximately one quarter to one half the height of the filled bag side walls 35. The inside diameter of the aperture 16 should approximately correspond to the outside diameter of the bag discharge chute 38 such that any holes or tears in the bag near the discharge chute will be covered during handling and transport, yet said discharge chute may be fully opened for final product discharge.

Each elastic member 24 and 24a should be of sufficient construction, length and elasticity to bring central panel 12 into firm engagement with bag bottom wall 37, and flexible aprons 14 into firm engagement with the lower portions of bag side walls 35. Concurrently, the elastic members 24 and 24a should also be of sufficient construction, length and elasticity to maintain firm engagement of the Diaper central panel and flexible aprons against the bag bottom and lower side walls, respectively, of the damaged flexible bulk container as said container narrows and elongates during the discharge of its contents. It is important to note that neither the elastic members 24 and 24a nor the Industrial Diaper 10 should be allowed to carry any substantial amount of the weight of the flexible bulk container during handling, loading or transportation. Said elastic members are intended only to maintain said Industrial Diaper firmly against the tear or hole 32, or splinter 33, in said container and prevent product leakage therefrom.

Figure 6:
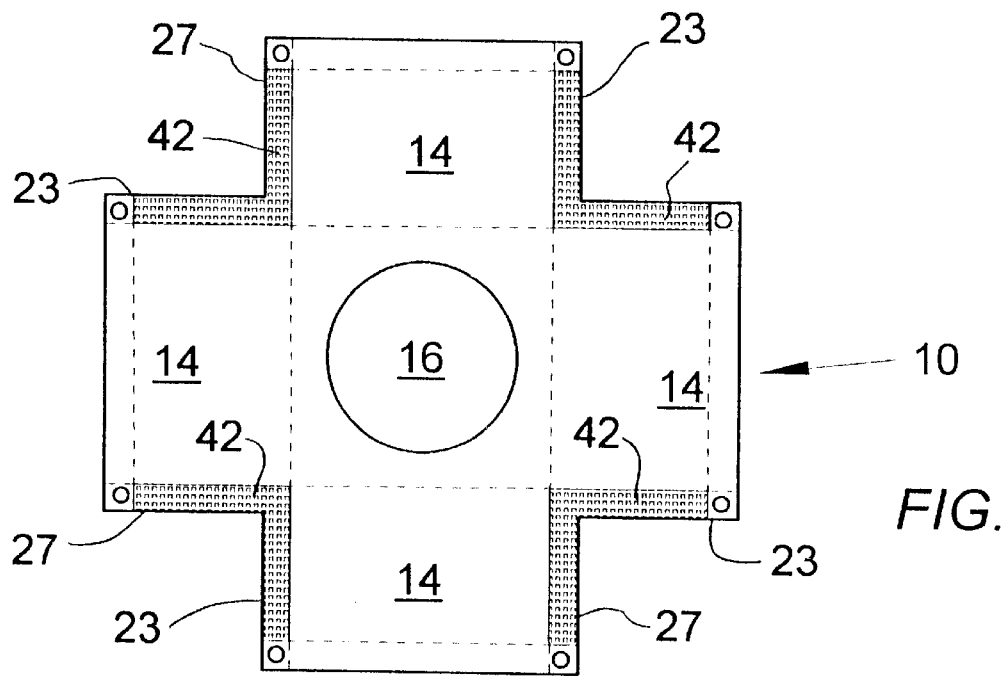
FIG. 6 shows a top view of a second embodiment of the current invention using hook and loop strips to releasably join the side walls of the present invention.

In FIG. 6 is shown a second embodiment of the invention wherein the Industrial Diaper 10 comprises sections of hook and loop 42 sewn on the first side edges 23 and second side edges 27 of each flexible apron 14 in place of the previously described flap 20. The assembly and usage of this embodiment of the Industrial Diaper is the same as described above, except that instead of folding flap 20 inside of second side edge 27, the adjacent hook and loop sections are brought into cooperation to provide a seam for the flexible apron edges.

Figure 7:
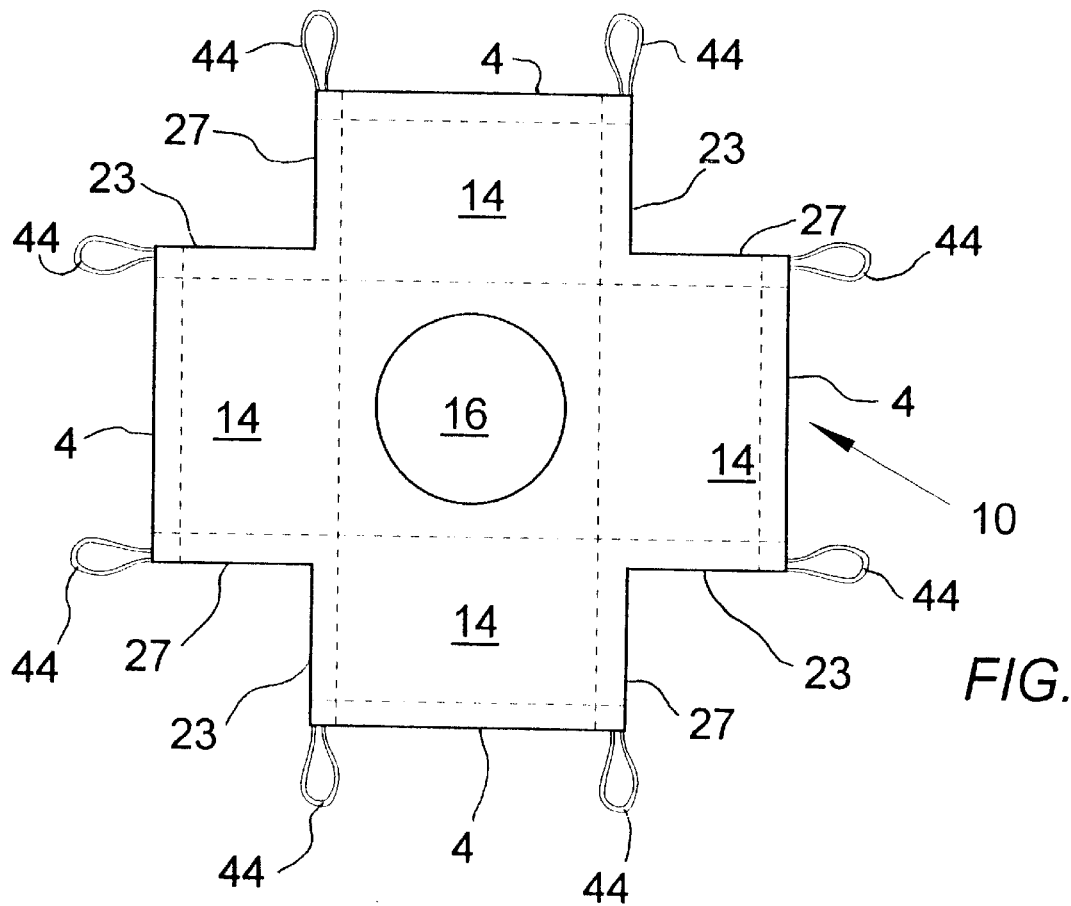
FIG. 7 shows a top view of a third embodiment of the current invention using loops as a securing means in place of conventional grommets.
Figure 8:
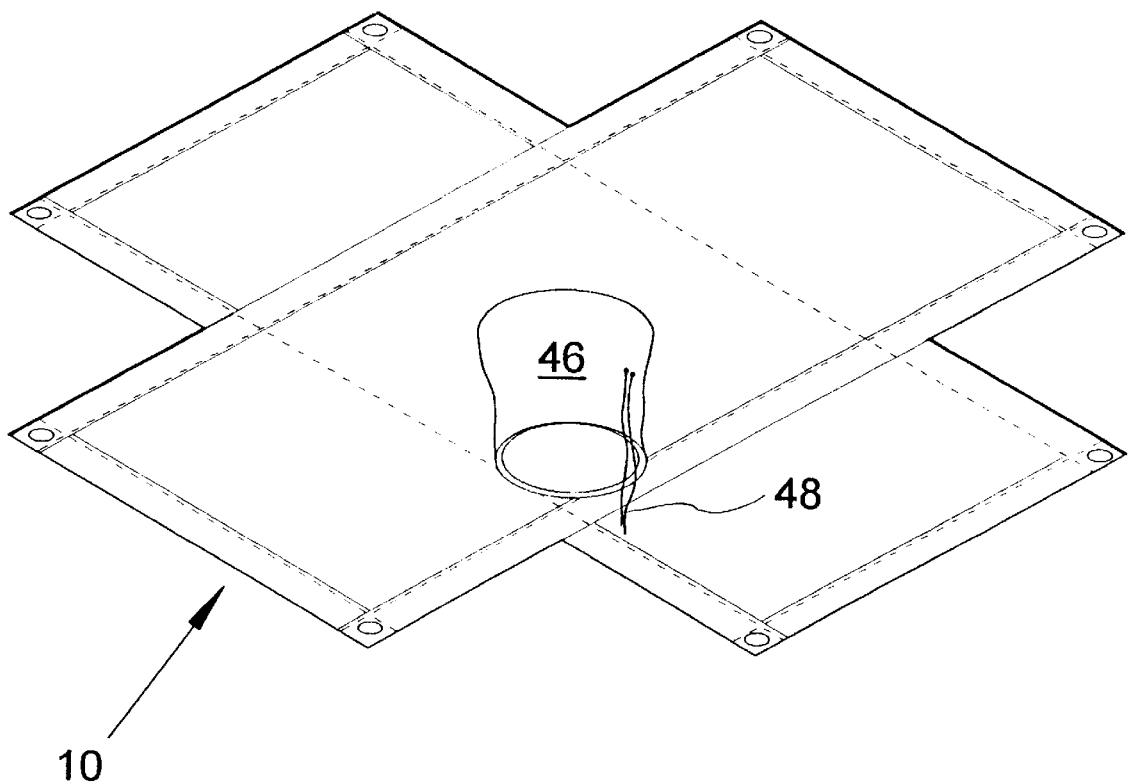
FIG. 8 shows a top perspective view of a fourth embodiment of the current invention which includes a discharge chute and discharge chute tie.

In FIG. 7 is shown a third alternative embodiment wherein the Industrial Diaper 10 comprises securing loops 44 provided at or near the intersection of each flexible apron distal edge 4 with first side edge 23 and second side edge 27, in place of the previously described grommets 18. The assembly and usage of this embodiment of the Industrial Diaper is the same as described above, except that securing means outer hook 28 or 28a is inserted into the loop 44 instead of a grommet. Each securing loop may be comprised of a length of webbing or fabric material. This is the simplest and most economical embodiment of the invention, In FIG. 8 is shown a as a disposable, non-reusable product. In FIG. 8 is shown a fourth embodiment of the invention wherein the Industrial Diaper 10 comprises an auxiliary discharge chute 46 disposed around previously described aperture 16 (not shown) and the existing bag discharge chute (designated 38 in FIG. 3). The assembly and usage of this embodiment of the Industrial Diaper is the same as described above, except that auxiliary discharge chute 46 functions in place of or in addition to the existing bag discharge chute 38. This alternative would be particularly useful if the existing bag discharge chute is damaged or leaking. The auxiliary discharge chute 46 can be of any conventional construction such as cone-shaped with full spout or flat-shaped with full spout, and can be closed in any well known manner such as by a tie cord 48.

Figure 9A:
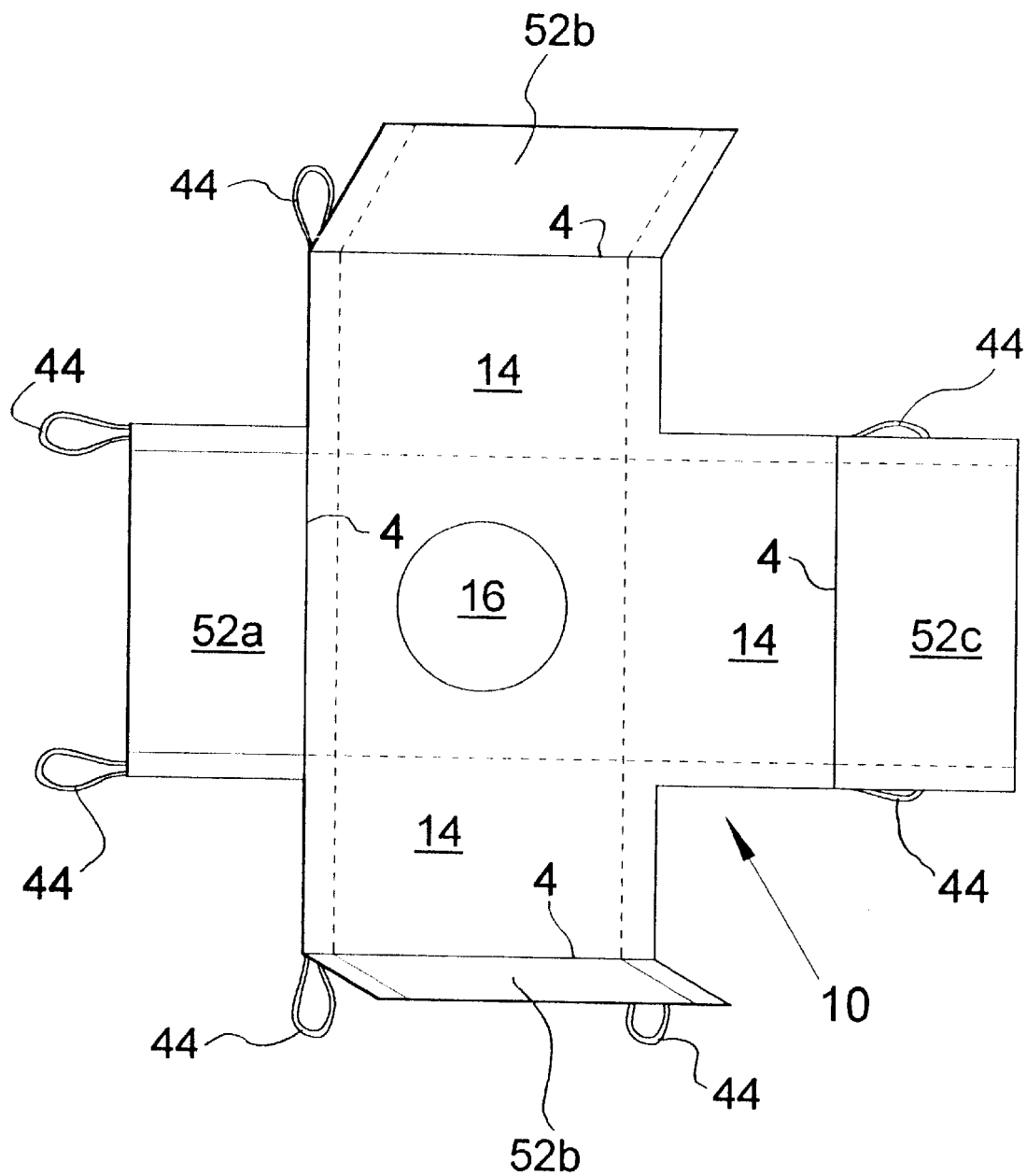
FIG. 9A shows a top perspective view of a fifth embodiment of the current invention which includes an extension on each flexible apron.
Figure 9B:
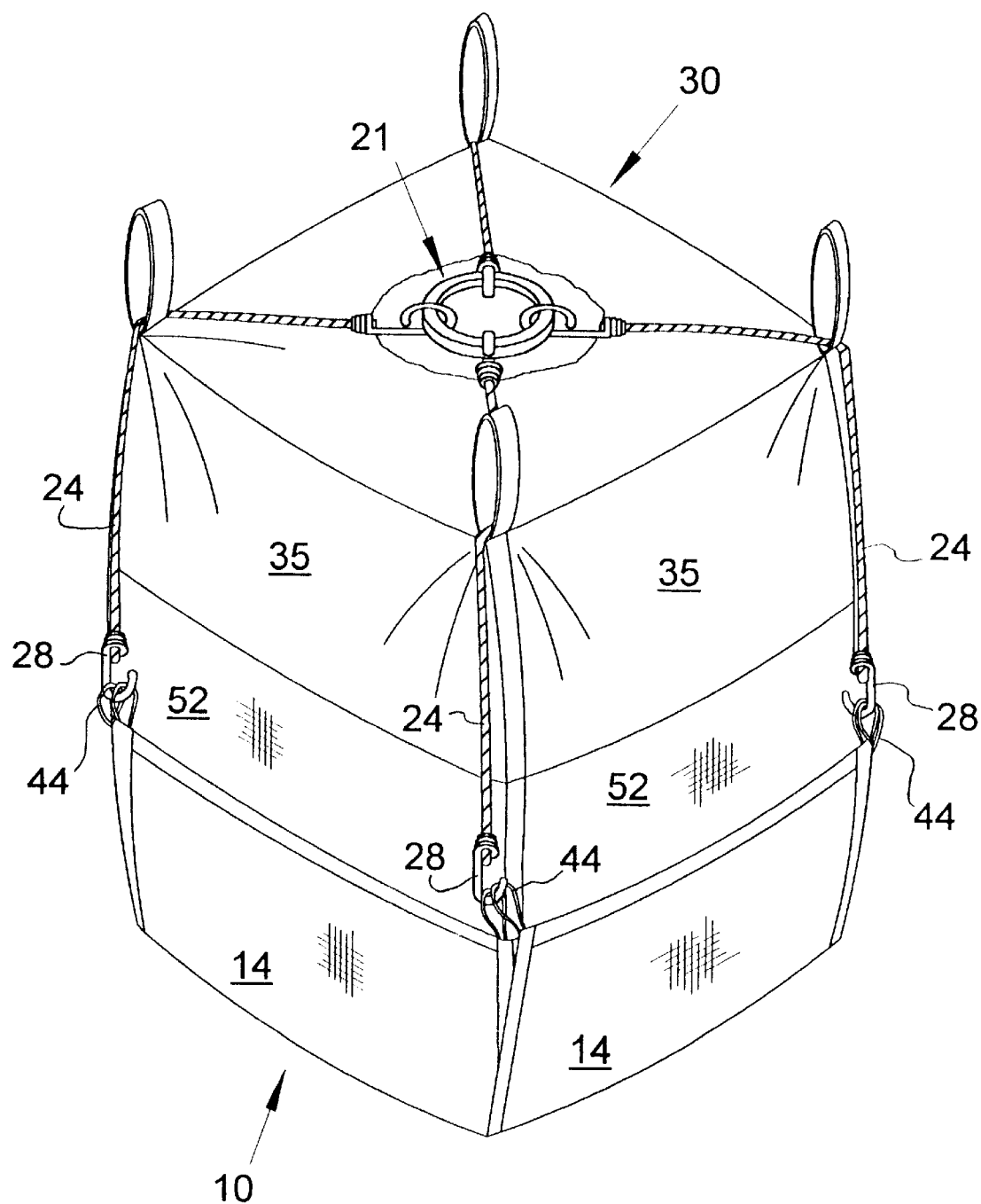
FIG. 9B shows a top perspective of a damaged flexible bulk container with the fifth embodiment of the present invention attached thereto.

During handling, storage and transport of flexible bulk containers, most holes, tears and splinters traditionally occur in the container bottom wall and lower section of the side walls. However, a small percentage of holes, tears and splinters may be found in the middle section of the container side wall which would not be mitigated by the aforementioned Industrial Diaper designs. To address this situation, there is illustrated in FIG. 9A and FIG. 9B a fifth embodiment of the invention wherein the Industrial Diaper 10 further comprises an extension panel 52 flexibly attached to the distal edge 4 of each flexible apron 14. If a hole, tear or splinter is located in the lower section 7 of a filled container such as designated 32 and 33 in FIG. 3, the extension panels 52 are not needed and can be folded over their adjacent flexible apron 14 to form an additional ply between the container side wall and the flexible apron, as illustrated by extension panel 52a in FIG. 9A. In the event the hole, tear or splinter is found on the middle section 6 of the container 30 of FIG. 3, the extension panels 52 are pivoted about distal edge 4 into their extended position. Extension panels 52b are shown partially extended, while extension panel 52c is shown fully extended. The Industrial Diaper is then secured to the damaged bag as previously described, each extension panel being held in place by the securing means 21 or 21a. In FIG. 9B, for example, the flexible aprons 14 are held firmly to the lower portion of the container side walls 35 by securing means 21, with hooks 28 inserted into loops 44, while extensions 52 are held against the upper middle section of the side walls by elastic members 24.

Figure 10:
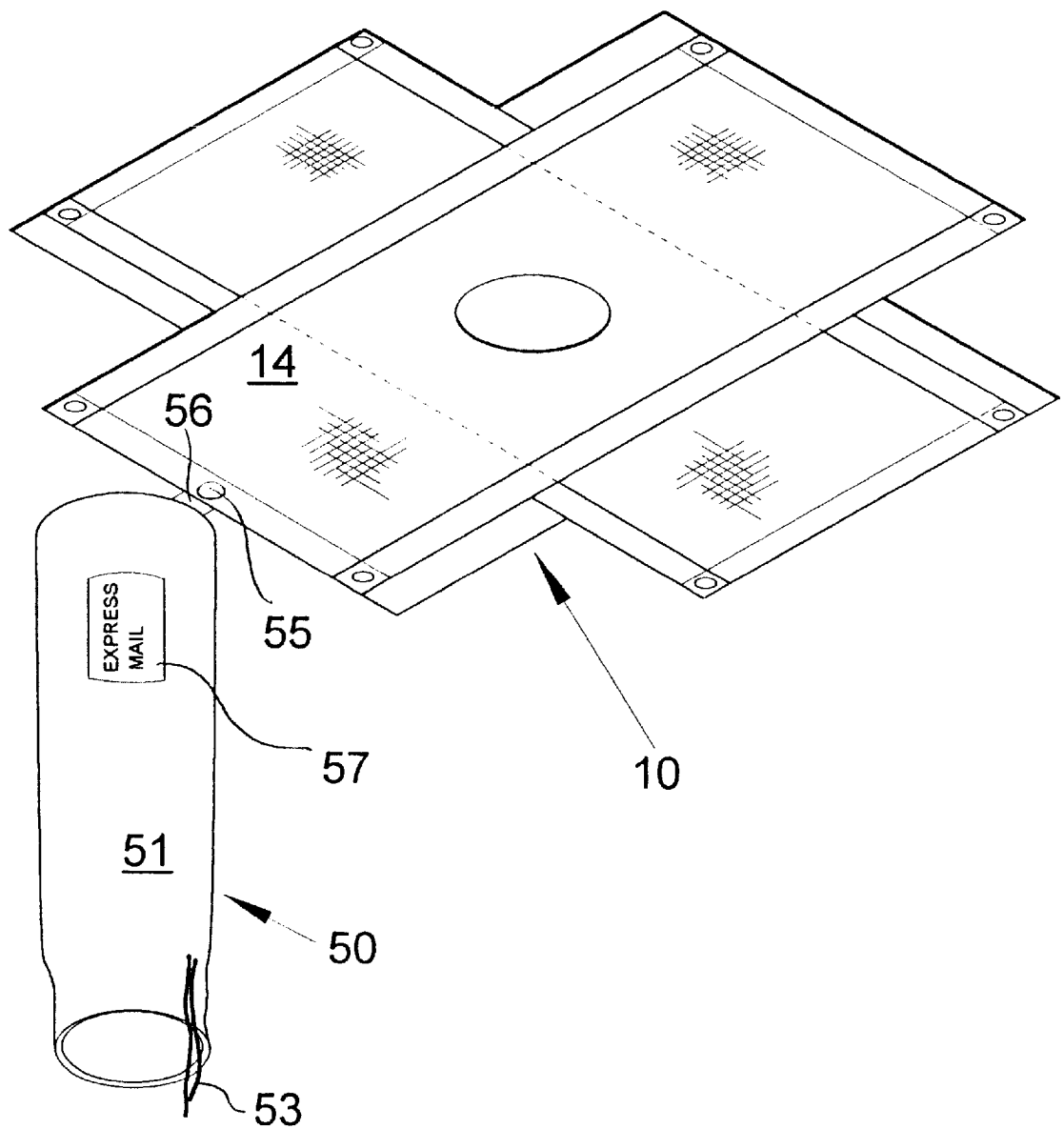
FIG. 10 shows a top perspective view of the present invention of FIG. 1 including a shipping container for transporting the current invention after usage.

In FIG. 10 is shown an alternative embodiment wherein the Industrial Diaper 10 further comprises a shipping container 50. Said shipping container would preferably consist of a generally cylindrical or box shaped bag 51 constructed of conventional flexible material approved by shipping and mailing services. In the preferred embodiment of the invention, after a damaged flexible bulk container has arrived at its destination and been emptied of its contents, the Industrial Diaper can be removed from said container, rolled up or otherwise folded into a compact form, and placed inside the shipping bag 51. Said shipping container is then closed by means of a draw string 53 or other conventional closing means and shipped back to the originating destination. To facilitate this process, a pre-printed shipping label 57 can be included on or inside the shipping container. To prevent loss of shipping container 50, said container can be attached to the Industrial Diaper by any well known means, such as a conventional button 55 and tab 56 removably attached to flexible apron 14. The described shipping container can be used with any of the previously described embodiments of the invention.

The invention here is a method and reusable device for preventing or limiting the leakage of flowable material from a damaged flexible bulk container. Although preferred embodiments of the present invention have been illustrated in the accompanying Drawings and described in the foregoing Detailed Description, it will be appreciated by those skilled in the art that various modifications and rearrangements of the component parts and elements of the present invention are possible within the scope of the present invention.

I claim:

1. For use with a damaged flexible bulk container including at least a top wall, an encircling side wall, a bottom wall, one or more lifting straps, and a discharge spout;

a flexible and collapsible apparatus comprising:
   (a) a central panel with an outside peripheral edge;
   (b) a plurality of flexible aprons, each said apron comprising a sheet having an inside edge flexibly affixed to said central panel outside peripheral edge; a first and second side edge; and a distal edge further comprising anchor means;
   (c) joining means for releasably securing said flexible apron first and second side edges; and
   (d) securing means for bringing said central panel in firm engagement with said bottom wall of said flexible bulk container, and bringing each said flexible apron in firm engagement with at least a portion of said flexible bulk container side wall adjacent to said bottom wall whereby said central panel and said flexible aprons are of predetermined size to minimize and contain spillage of flowable material in and about said damaged flexible bulk container.

2. The apparatus as claimed in claim 1, wherein said central panel defines an aperture therethrough through which said flowable material within said flexible bulk container may be discharged, said aperture being sized to substantially surround said flexible bulk container discharge spout.

3. The apparatus as claimed in claim 1, wherein said securing means comprises an annular member disposed upon said flexible bulk container top wall, and a plurality of elastic fasteners with first and second hooks disposed at the end of each said elastic fastener, whereby said first hook of each said elastic fastener is removably attached to said annular member, and said second hook of each said elastic fastener is removably attached to said flexible apron anchor means.

4. The apparatus as claimed in claim 3, wherein said anchor means comprises one or more grommets disposed proximate to said flexible apron distal edge, each said grommet adapted to receive said second hook.

5. The apparatus as claimed in claim 3, wherein said anchor means comprises one or more connecting loops disposed proximate to said flexible apron distal edge, each said connecting loop adapted to receive said second hook.

6. The apparatus as claimed in claim 1, wherein said joining means for releasably securing said flexible apron first and second side edges comprises a wing flap flexibly attached to and extending from said first side edge, whereby when said central panel is brought into firm engagement with said flexible bulk container bottom wall, and when said flexible aprons are brought into firm engagement with said bulk container side walls, each said first side edge wing flap is folded under an adjacent said flexible apron second edge such that a contiguous series of said flexible aprons contain spillage of said flowable material from said damaged flexible bulk container.

7. For use with a damaged flexible bulk container including at least a top wall, a bottom wall, four side walls each having an upper section and lower section, and one or more lifting straps;
    a flexible and collapsible industrial diaper comprising:
      (a) a central panel with an outside peripheral edge;
      (b) a plurality of flexible aprons, each said apron comprising a sheet having an inside edge flexibly affixed to said central panel outside peripheral edge; a first and second side edge; and a distal edge further comprising anchor means;
      (c) joining means for releasably securing said flexible apron first and second side edges; and
      (d) securing means for bringing said central panel into firm engagement with said bottom wall of said flexible bulk container, and bringing each said flexible apron into firm engagement with said flexible bulk container side wall lower section
whereby said central panel is sized to receive said container bottom wall and each said flexible apron is sized to receive at least a portion of said container side wall lower section adjacent said flexible apron, and whereby said central panel and flexible aprons minimize and contain leakage of flowable material in and about said damaged flexible bulk container.

8. The apparatus as claimed in claim 7, wherein said central panel defines an aperture therethrough through which said flowable material within said flexible bulk container may be discharged, said aperture being sized to substantially surround a discharge spout of said flexible bulk container, whereby said flexible bulk container bottom wall incorporates a discharge spout.

9. The apparatus as claimed in claim 8, wherein said central panel further comprises a discharge chute with tying means formed therein, said discharge chute being sized to substantially surround said central panel aperture and said flexible bulk container discharge spout.

10. The apparatus as claimed in claim 7, wherein one of said flexible aprons defines an aperture therethrough through which said flowable material within said flexible bulk container may be discharged, said aperture being sized to substantially surround a discharge spout of said flexible bulk container, whereby said flexible bulk container side wall adjacent to said bottom wall incorporates a discharge spout.

11. The apparatus as claimed in claim 7 wherein said securing means comprises an annular member disposed upon said flexible bulk container top wall, and a plurality of elastic fasteners with first and second hooks disposed at the end of each said elastic fastener, whereby each said elastic fastener first hook is removably attached to said annular member, and each said elastic fastener second hook is removably attached to said flexible apron anchor means.

12. The apparatus as claimed in claim 7, wherein said securing means comprises a plurality of elastic fasteners with first and second hooks disposed at the end of each said elastic fastener, whereby each said elastic fastener first hook may be removably attached to one of said flexible apron anchor means, and each said elastic fastener second hook may be removably attached to said anchor means of the flexible apron engaging the opposing flexible bulk container side wall.

13. The apparatus as claimed in claim 12, wherein said flexible apron anchor means comprises one or more grommets disposed proximate to said flexible apron distal edge, each said grommet adapted to receive said first hook or second hook.

14. The apparatus as claimed in claim 12, wherein said flexible apron anchor means comprises one or more connecting loops disposed proximate to said flexible apron distal edge, each said connecting loop adapted to receive said first hook or second hook.

15. The apparatus as claimed in claim 7, wherein said joining means for releasably securing said flexible apron first and second side edges comprises a section of hook and loop material disposed upon said side edges, whereby when said central panel is brought into firm engagement with said flexible bulk container bottom wall, and when said flexible aprons are brought into firm engagement with said bulk container side wall adjacent to said container bottom wall, each said first side edge hook and loop material is brought into firm engagement with adjacent said flexible apron second edge hook and loop material such that a contiguous series of said flexible aprons contain spillage of said flowable material from said damaged flexible bulk container.

16. The apparatus as claimed in claim 7, wherein each said flexible apron further comprises an extension panel flexibly attached to said distal edge, whereby said extension panel is folded inwardly into substantial engagement with said flexible apron when flowable material leakage is occurring only from said flexible bulk container side wall lower section, and said extension panel is folded upwardly into substantial engagement with a middle section of said flexible bulk container side wall when flowable material leakage is occurring in said middle section, each said extension panel being maintained in firm engagement with said upper section by said securing means.

17. The apparatus as claimed in claim 7, further comprising a closable, flexible, collapsible shipping container releasably attached to said apparatus, said shipping container being sized to receive said apparatus when said apparatus is folded and compacted, and constructed to be acceptable by conventional shipping and mailing services.

18. For use with a damaged flexible bulk container including at least a top wall, a bottom wall with a discharge spout extending therefrom, four side walls each having a middle section and lower section, and one or more lifting straps;
    a method to contain leakage of flowable material in and about said damaged flexible bulk container by the attachment of a flexible and collapsible industrial diaper, comprising;
      (a) suspending said damaged flexible bulk container to allow access to said bottom wall and said side wall lower sections;
      (b) positioning said industrial diaper substantially below said flexible bulk container, said industrial diaper comprising a central panel with a peripheral edge defining an aperture of predetermined diameter therein; four flexible aprons, each said apron comprising a sheet having an inside edge flexibly affixed to said central panel peripheral edge; a first and second side edge; and a distal edge further comprising anchor means;

(c) rotating said industrial diaper such that each said flexible apron is aligned substantially perpendicular to one such flexible bulk container side wall;

(d) lowering said flexible bulk container onto said industrial diaper central panel such that said bottom wall discharge spout is substantially received within the perimeter of said central panel aperture;

(e) raising each said flexible apron distal edge until said flexible apron is brought into engagement with its cooperating flexible bulk container side wall lower section;

(f) providing elastic securing means between said flexible bulk container top wall and each said flexible apron distal edge anchor means; and (g) providing joining means for releasably securing each said flexible apron first and second side edges whereby said industrial diaper central panel contains leakage of flowable material from said damaged flexible bulk container bottom wall, whereby said industrial diaper flexible aprons contain leakage of flowable material from said damaged flexible bulk container side wall lower sections, whereby said joining means prevents leakage of flowable material through the intersections of said flexible apron side edges and funnels said leakage towards said industrial diaper central panel, and whereby said damaged flexible bulk container can by handled, stored and shipped without excessive leakage of flowable material therefrom.

* * * * *